(12) United States Patent
Mueller

(10) Patent No.: US 8,959,477 B2
(45) Date of Patent: Feb. 17, 2015

(54) SCRIPTING LANGUAGE FOR BUSINESS APPLICATIONS

(75) Inventor: Andreas Mueller, Bruhl (DE)

(73) Assignee: SAP SE, Walldorf (DE)

( * ) Notice: Subject to any disclaimer, the term of this patent is extended or adjusted under 35 U.S.C. 154(b) by 210 days.

(21) Appl. No.: 13/278,945

(22) Filed: Oct. 21, 2011

(65) Prior Publication Data

US 2013/0104100 A1    Apr. 25, 2013

(51) Int. Cl.
*G06F 9/45* (2006.01)
*G06F 9/44* (2006.01)
*G06F 9/455* (2006.01)

(52) U.S. Cl.
CPC .. *G06F 9/44* (2013.01); *G06F 8/30* (2013.01); *G06F 9/45512* (2013.01); *G06F 8/36* (2013.01)
USPC ........... 717/106; 717/115; 717/120; 717/136; 717/140; 717/163

(58) Field of Classification Search
USPC ................. 717/106–107, 109–110, 113, 116, 717/136–137, 141, 145; 719/330; 707/101
See application file for complete search history.

(56) References Cited

U.S. PATENT DOCUMENTS

| | | | |
|---|---|---|---|
| 6,684,388 B1 * | 1/2004 | Gupta et al. .................. | 717/136 |
| 7,346,897 B2 * | 3/2008 | Vargas ........................... | 717/137 |
| 7,614,044 B2 * | 11/2009 | Bhansali et al. .............. | 717/145 |
| 7,761,848 B1 * | 7/2010 | Chaffin ......................... | 717/116 |
| 8,453,126 B1 * | 5/2013 | Ganelin ........................ | 717/136 |
| 2003/0084425 A1 * | 5/2003 | Glaser ............................ | 717/110 |
| 2004/0148588 A1 * | 7/2004 | Sadiq ............................ | 717/109 |
| 2006/0085465 A1 * | 4/2006 | Nori et al. ..................... | 707/101 |
| 2007/0028208 A1 * | 2/2007 | Maki ............................. | 717/106 |
| 2007/0157165 A1 * | 7/2007 | Kim .............................. | 717/113 |
| 2007/0199002 A1 * | 8/2007 | Marvin et al. ................ | 719/330 |
| 2007/0271548 A1 * | 11/2007 | Chawla et al. ................ | 717/106 |
| 2008/0127138 A1 * | 5/2008 | Yard ............................. | 717/141 |
| 2009/0024986 A1 * | 1/2009 | Meijer et al. ................. | 717/137 |
| 2009/0125878 A1 * | 5/2009 | Cullum et al. ................ | 717/106 |
| 2010/0306734 A1 * | 12/2010 | Gupta .......................... | 717/107 |
| 2011/0126169 A1 * | 5/2011 | Moore .......................... | 717/106 |

OTHER PUBLICATIONS

Saff, David et al., "Continuous Testing in Eclipse", 2004, Elsevier.*
ABAP from Wikipedia, the free encyclopedia, retrieved from the Internet on Oct. 21, 2011, http://en.wikipedia.org/wiki/ABAP, 12 pages.

* cited by examiner

*Primary Examiner* — Lewis A Bullock, Jr.
*Assistant Examiner* — Gilles Kepnang
(74) *Attorney, Agent, or Firm* — Fish & Richardson P.C.

(57) ABSTRACT

The present disclosure involves systems, software, and computer implemented methods for providing a scripting language for business applications. One process includes operations for providing a scripting language editor for generating software components for a business application, the scripting language editor configured to receive scripting language input. A scripting language file saved by the scripting language editor is identified. Metadata associated with at least one of a business object or a data type of a platform of the business application is retrieved. A business application language file is generated based on the scripting language file and the retrieved metadata.

20 Claims, 9 Drawing Sheets

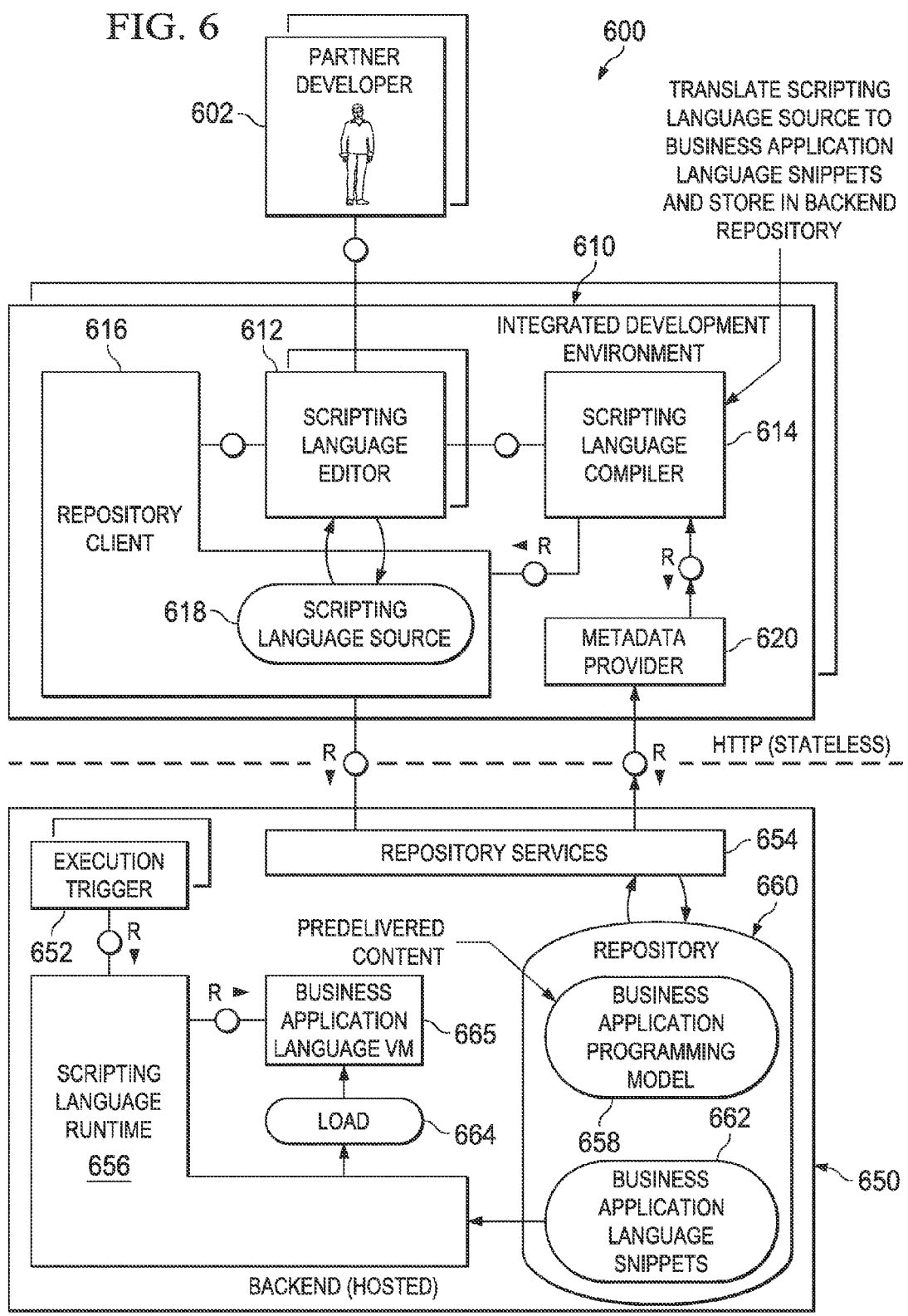

SCRIPTING LANGUAGE FOR BUSINESS APPLICATIONS

TECHNICAL FIELD

The present disclosure relates to software, computer systems, and computer implemented methods for providing a scripting language for business applications.

BACKGROUND

Business applications, such as Enterprise Resource Planning software, may consist of modular application components that are combinable to meet the needs of a specific business scenario. After initial release or development of the business application, additional application components, features, or add-ons may be developed to enhance the functionality of the business application. In some cases, development of the business application and add-on components may be conducted internally within a business organization, such as a business application software developer, using comprehensive business application programming languages. The business application, however, may also support the addition of add-on components developed and delivered by third parties. The third party developers of the add-on components may need additional support from the business application software developer for programming add-on components. Some third parties may not be familiar with the business application programming language of the business application software developer.

SUMMARY

The present disclosure describes techniques for providing a scripting language for business applications. A computer program product is encoded on a tangible storage medium, where the product comprises computer readable instructions for causing one or more processors to perform operations. These operations may include providing a scripting language editor for generating software components for a business application, the scripting language editor configured to receive scripting language input. A scripting language file saved by the scripting language editor is identified. Metadata associated with at least one of a business object or a data type of a platform of the business application is retrieved. A business application language file is generated based on the scripting language file and the retrieved metadata.

These and other embodiments may optionally include one or more of the following features. The metadata is retrieved from a backend system hosting a runtime environment for the business application language file. The operations further include transmitting the business application language file to the backend system. The operations further include preventing a user of the scripting language editor from accessing data associated with users of other instances of the scripting language editor, wherein the other instances of the scripting language editor are connected to the backend system. Generating the business application language file includes translating scripting language code in the scripting language file into a business application language associated with the business application. The scripting language file includes scripting language code snippets and the business application language file includes business application language code snippets. The business application language file includes Advanced Business Application Programming (ABAP) code. The scripting language editor includes a visual programming shell providing core source code editing features. Identifying the scripting language file includes designating the scripting language file for compilation in response to a save of the scripting language file in the scripting language editor.

While generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 6 is a diagram illustrating an example architecture for providing a scripting language for business application components;

DETAILED DESCRIPTION

Figure 1:
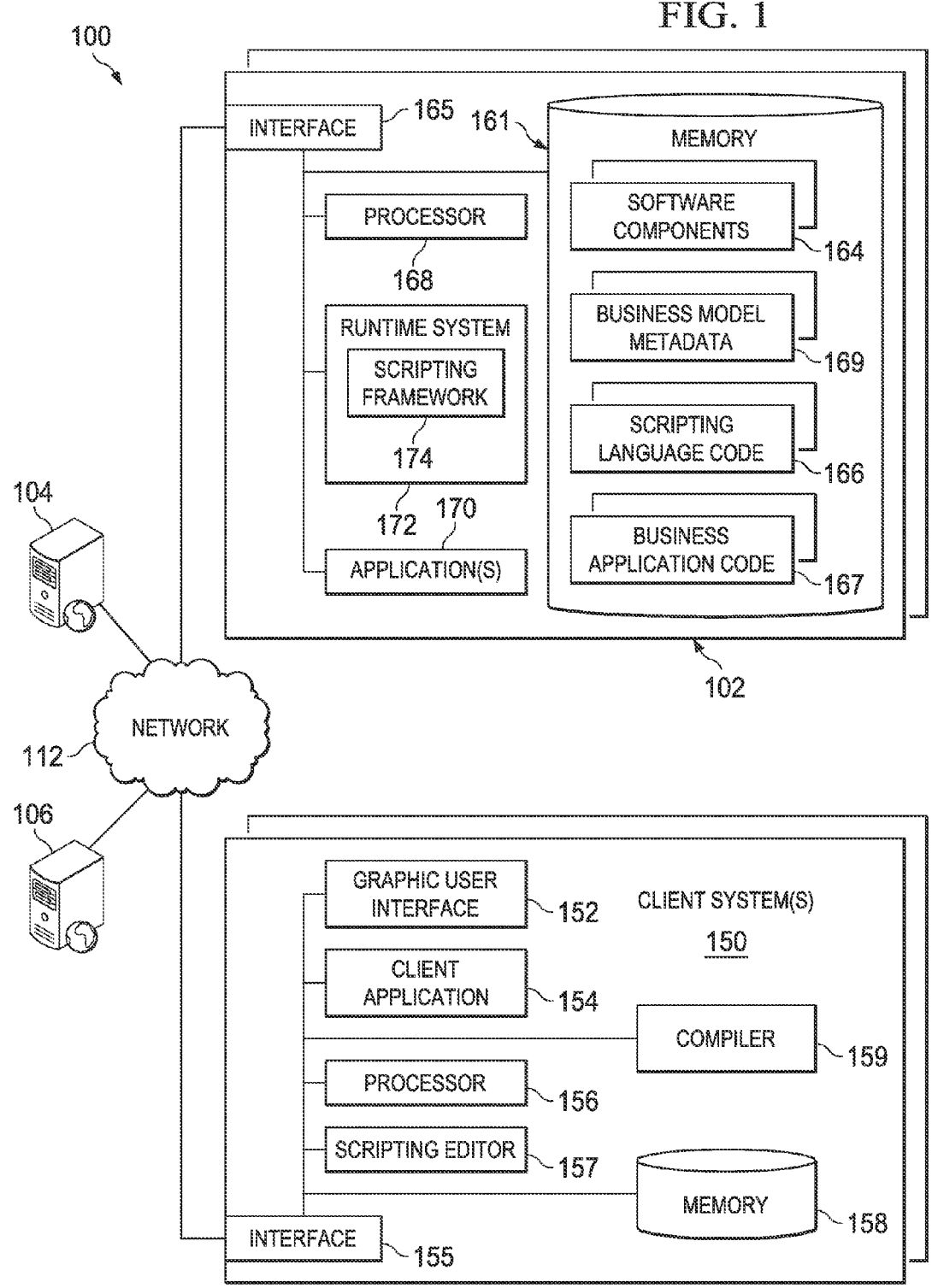
FIG. 1 illustrates an example system implementing a scripting language for business application components.

This disclosure generally describes computer systems, software, and computer implemented methods for providing a scripting language for business applications. Software developers may create additional components for a business application to add functionality. The additional components may be implemented in a programming language compatible with the business application. For example, the business application may originally be developed within an organization using a business application language. Although the software developers may use the same business application language to develop additional components for the business application, a scripting language may allow the software developers to draft programming code in the scripting language without using the business application language. The scripting language may include a focused set of features tailored for developing additional or supplemental components for the business application platform or for implementing development artifacts associated with the business application platform. Accordingly, developers who may not have experience or knowledge regarding the business application language may still develop software components or development artifacts for the business application using the scripting language.

In some implementations, the scope of the scripting language may be at the code snippet level for exits and callbacks. A scripting language compiler translates the scripting language snippets into business application language snippets. The business application language snippets may be stored as an additional component for the business application and may be executed at runtime for an end-user of the business application. The compiler may use a domain-specific metamodel to translate the scripting language into a business application language. The metamodel may be based on metadata retrieved from a Master Data Repository System (MDRS), allowing the compiler to consume model entities associated with the business application as path expressions within the scripting language. The model entities retrieved from the MDRS may include, for example, business objects, nodes, actions, queries, associations, data types, or messages.

The environment for implementing the scripting language may include a sandbox environment for limiting a software developer's access to data associated with other software developers. For example, the sandbox environment for the scripting language may prevent software developers that have produced malicious or erroneous components from tampering with or accidentally accessing the data of other users. The script execution runtime may strictly monitor or disable security-relevant features, such as direct access to database tables. Instead, data access may occur through the business object infrastructure. In some implementations, the business application development environment and the scripting language compiler may hide various implementation frameworks within the business application platform from the user. Accordingly, documentation overhead and ramp-up time may be decreased while increasing development productivity through a simplified programming model.

Turning to the illustrated example, FIG. 1 illustrates an example environment 100 for providing a scripting language for business applications. The illustrated environment 100 includes or is communicably coupled with one or more client systems 150 and servers 102, 104, and 106, at least some of which may communicate across network 112. In general, environment 100 depicts an example configuration of a system capable of providing a scripting language for developing additional components or development artifacts for a business application. In some implementations, the runtime system 172 for the scripting language may be implemented on a server, such as server 102, accessible to a user at client system 150 through a network 112. Further, the runtime system 172, scripting framework 174, and other services provided by server 102, may be distributed across multiple servers, such as servers 104 and 106, in a distributed cluster-based environment, for example. In a distributed cluster-based environment, one or more additional servers (e.g., servers 104 and 106) may be included in environment 100, each server having components similar to those depicted in FIG. 1 for server 102 and providing services associated with distributed applications hosted by the servers in the distributed cluster-based environment. In certain instances, client system 150 and servers 102, 104, and 106 may be logically grouped within a cloud computing network. The client system 150 may include a scripting editor 157 and compiler 159 for the scripting language that communicates with the scripting framework 174. Accordingly, the system may be provided as an on-demand solution through the cloud computing network as well as a traditional server-client system or a local application at client 150. Alternatively, the scripting editor 157, compiler 159, and scripting framework 174 may be provided through a traditional server-client implementation or locally at client system 150 without the need for accessing a hosted application through network 112.

In general, server 102 is any server that stores one or more applications 170, where at least a portion of the applications 170 may be hosted applications executed via requests and responses sent to users or clients within and communicably coupled to the illustrated environment 100 of FIG. 1. For example, server 102 may be a Java Platform, Enterprise Edition (JEE)-compliant application server that includes Java technologies such as Enterprise JavaBeans (EJB), JEE Connector Architecture (JCA), Java Messaging Service (JMS), Java Naming and Directory Interface (JNDI), and Java Database Connectivity (JDBC). In some instances, the server 102 may store a plurality of various applications 170, while in other instances, the server 102 may be a dedicated server meant to store and execute only a single application 170. In some instances, the server 102 may comprise a web server or be communicably coupled with a web server, where the applications 170 represent one or more web-based applications accessed and executed via network 112 by client system 150 of the environment to perform the programmed tasks or operations of the application 170.

At a high level, the server 102 comprises an electronic computing device operable to receive, transmit, process, store, or manage data and information associated with the environment 100. The server 102 illustrated in FIG. 1 may be responsible for receiving application requests from one or more client applications or business applications associated with client system 150 of environment 100, responding to the received requests by processing said requests in the associated application 170, and sending the appropriate response from the application 170 back to the requesting client application. The server 102 may also receive requests and respond to requests from other components on network 112. Alternatively, the application 170 at server 102 may be capable of processing and responding to requests from a user locally accessing server 102. Accordingly, in addition to requests from the external client system 150 illustrated in FIG. 1, requests associated with the applications 170 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 102, environment 100 may be implemented using one or more servers such as servers 104 and 106, as well as computers other than servers, including a server pool. Indeed, server 102 and client system 150 may be any computer or processing device such as, for example, a blade server, general-purpose personal computer (PC), Macintosh, workstation, UNIX-based workstation, personal digital assistant (PDA), mobile phone, palmtop computer, tablet, or any other suitable device. In other words, the present disclosure contemplates computers other than general purpose computers, as well as computers without conventional operating systems. Further, illustrated server 102 and client system 150 may be adapted to execute any operating system, including Linux, UNIX, Windows, Mac OS, or any other suitable operating system.

In the present implementation, and as shown in FIG. 1, the server 102 includes a processor 168, an interface 165, a memory 161, and one or more applications 170. The interface 165 is used by the server 102 for communicating with other systems in a client-server or other distributed environment (including within environment 100) connected to the network 112 (e.g., client system 150, as well as other systems communicably coupled to the network 112). Generally, the interface 165 comprises logic encoded in software and/or hardware in a suitable combination and operable to communicate with the network 112. More specifically, the interface 165 may comprise software supporting one or more communication protocols associated with communications such that the network 112 or interface's hardware is operable to communicate physical signals within and outside of the illustrated environment 100.

In some implementations, server 102 may include a user interface, such as a graphical user interface (GUI). The GUI comprises a graphical user interface operable to, for example, allow the user of the server 102 to interface with at least a portion of the platform for any suitable purpose, such as creating, preparing, requesting, or analyzing data, as well as viewing and accessing source documents associated with business transactions. Generally, the GUI provides the particular user with an efficient and user-friendly presentation of business data provided by or communicated within the system. The GUI may comprise a plurality of customizable frames or views having interactive fields, pull-down lists, and buttons operated by the user. For example, GUI may provide interactive elements that allow a user to select from a list of suggested entries for input into a data field displayed in GUI. More generally, GUI may also provide general interactive elements that allow a user to access and utilize various services and functions of application 170. The GUI is often configurable, supports a combination of tables and graphs (bar, line, pie, status dials, etc.), and is able to build real-time portals, where tabs are delineated by key characteristics (e.g. site or micro-site). Therefore, the GUI contemplates any suitable graphical user interface, such as a combination of a generic web browser and command line interface (CLI) that processes information in the platform and efficiently presents the results to the user visually.

Generally, example server 102 may be communicably coupled with a network 112 that facilitates wireless or wireline communications between the components of the environment 100 (i.e., between the server 102 and client system 150), as well as, with any other local or remote computer, such as additional clients, servers, or other devices communicably coupled to network 112 but not illustrated in FIG. 1. In the illustrated environment, the network 112 is depicted as a single network in FIG. 1 but may be a continuous or discontinuous network without departing from the scope of this disclosure, so long as at least a portion of the network 112 may facilitate communications between senders and recipients.

Network 112 may be all or a portion of an enterprise or secured network, while in another instance at least a portion of the network 112 may represent a connection to the Internet. In some instances, a portion of the network 112 may be a virtual private network (VPN), such as, for example, the connection between client system 150 and server 102. Further, all or a portion of network 112 may comprise either a wireline or wireless link. Example wireless links may include 802.11a/b/g/n, 802.20, WiMax, and/or any other appropriate wireless link. In other words, network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. Network 112 may also include one or more local area networks (LANs), radio access networks (RANs), metropolitan area networks (MANs), wide area networks (WANs), all or a portion of the Internet, and/or any other communication system or systems at one or more locations. Network 112, however, is not a required component of the present disclosure, and the elements hosted by server 102, such as the runtime system 172 and scripting framework 174, may be implemented locally at a client system 150 or locally at server 102.

Client system(s) 150 may have access to resources such as server 102 within network 112. In certain implementations, the servers within the network 112, including server 102 in some instances, may comprise a cloud computing platform for providing cloud-based services. The terms "cloud," "cloud computing," and "cloud-based" may be used interchangeably as appropriate without departing from the scope of this disclosure. Cloud-based services may be hosted services that are provided by servers such as 102, 104, and 106 and delivered across a network to a client platform to enhance, supplement, or replace applications executed locally on a client computer. Clients 150 may use cloud-based services to quickly receive software upgrades, applications, and other resources that would otherwise require a lengthy period of time before the resources may be delivered to client systems 150. Additionally, other devices may also have access to cloud-based services, such as on-demand services provided by servers accessible through network 112. A cloud platform deployment implementation, however, is not a required element of the present disclosure, and other distributed infrastructures such as cluster-based systems may also be used.

As illustrated in FIG. 1, server 102 includes a processor 168. Although illustrated as a single processor 168 in FIG. 1, two or more processors may be used according to particular needs, desires, or particular embodiments of environment 100. Each processor 168 may be a central processing unit (CPU), a blade, an application specific integrated circuit (ASIC), a field-programmable gate array (FPGA), or another suitable component. Generally, processor 168 executes instructions and manipulates data to perform the operations of server 102 and, specifically, the one or more plurality of applications 170. Specifically, the server's processor 168 executes the functionality required to receive and respond to requests from client system 150 and respective client applications 154 or other servers 104 and 106 in environment 100, as well as the functionality required to perform the other operations of the application 170.

Regardless of the particular implementation, "software" may include computer-readable instructions, firmware, wired or programmed hardware, or any combination thereof on a tangible, non-transitory, medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Some software may be associated with BPM notations including BPMN, BPEL, UML state charts, event-driven process chains (EPC), Petri Nets, and the like. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components may be combined into single components as appropriate. In the illustrated environment 100, processor 168 executes one or more applications 170 on server 102.

At a high level, each of the one or more applications 170 is any application, program, module, process, or other software that may execute, change, delete, generate, or otherwise manage information according to the present disclosure, particularly in response to and in connection with one or more requests received from the illustrated client system 150 and its associated client applications 154 or from other servers or components through a network 112. In certain cases, only one application 170 may be located at a particular server 102. In others, a plurality of related and/or unrelated applications 170 may be stored at a single server 102, or located across a plurality of other servers 104 and 106, as well. In certain cases, environment 100 may implement a composite business process application 170. For example, portions of the composite application may be implemented as Enterprise Java Beans (EJBs) or design-time components may have the ability to generate run-time implementations into different platforms, such as JEE (Java Platform, Enterprise Edition), ABAP (Advanced Business Application Programming) objects, or Microsoft's .NET, among others.

Additionally, one or more of the applications 170 may represent web-based applications accessed and executed by client system 150 or client applications 154 via the network 112 (e.g., through the Internet). Further, while illustrated as internal to server 102, one or more processes associated with a particular application 170 may be stored, referenced, or executed remotely. For example, a portion of a particular application 170 may be a web service associated with the application that is remotely called, while another portion of the application 170 may be an interface object or agent bundled for processing at a client system 150. Moreover, any or all of the applications 170 may be a child or sub-module of another software module or enterprise application (not illustrated) without departing from the scope of this disclosure. Still further, portions of the application 170 may be executed by a user working directly at server 102, as well as remotely at client system 150.

As illustrated, server 102 may also include a runtime system 172 with a scripting framework 174. The server 102 may function as a backend system in connection with one or more client systems 150 to support a scripting language for business application components and artifacts. For example, a developer at client 150 may use a scripting editor 157 to generate scripting language code. In some implementations, the scripting language code may be in the form of code snippets. A compiler 159 may translate the scripting language code snippets into business application code 167 and store the code 167 in memory 161 at the server 102. The runtime system 172 may include the generated business application code 167 into a base class context. The base class may offer reusable convenience methods for the business application code generation. Accordingly, the runtime system 172 provides support for the scripting language translation process, allowing the compiler 159 to generate wrapper method calls rather than low level code, for example. In some implementations, the scripting framework 174 within the runtime system 172 identifies business application code 167 associated with certain business objects to be executed from memory 161 and dynamically builds session local reports. Further, the scripting framework 174 may provide access into a number of different execution environments for the generated business application code 167.

In general, server 102 also includes memory 161 for storing data and program instructions. Memory 161 may include any memory or database module and may take the form of volatile or non-volatile memory including, without limitation, magnetic media, optical media, random access memory (RAM), read-only memory (ROM), removable media, or any other suitable local or remote memory component. Memory 161 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of server 102 and its one or more business process applications 170.

Memory 161 may also store data objects such as software components 164. In general, software components 164 may include stand-alone applications, modules, embedded applications, user interfaces, widgets, functions, or any other application or software module. In some implementations, software components 164 may include binary units that export and import functionality using a standardized interface mechanism. Software components 164 may represent one or more logical or organization-related processes or tasks. The underlying infrastructure of a software component 164 may support composition of components by providing mechanisms for introspection, event-handling, persistence, dynamic linking, and layout management.

In certain instances, software components 164 may be independent of a particular system, language, platform, application, or tool. Accordingly, software components 164 may be integrated with other software components from different providers, for example, into a common system. In certain instances, software components 164 may include additional functionality developed to supplement a business application. For example, a user of client system 150 may generate source code in a scripting language to develop an additional software component to add functionality to a current business application. Although the business application may be associated with a business application language, a compiler 159 at the client system 150 may translate the scripting language source code into the business application language as an add-on component to the business application. An end-user of the business application may then select the add-on component from memory 161. In some instances, different developers may store a plurality of software components 164 in memory 161 for end-users to select from. Further, software components 164 may include development artifacts, such as use cases, class diagrams, models, requirements, intermediate-level documentation, executable files, and design documents, for example.

Memory 161 may also store scripting language code 166 and business application code 167. The scripting language code 166 may be received from the client system 150 after a developer has drafted and saved the scripting language code 166 using a scripting editor 157 at the client system 150. In some instances, a copy of the scripting language code 166 is stored at both the client system 150 and the server 102. The scripting language code 166 may be translated into business application code 167 by a compiler 159 at the client system 150. Although the compiler 159 is illustrated as being located at the client system 150 in FIG. 1, the compiler 159 may also be located at the server 102 in some instances. In certain implementations, the client system 150 may need access to business model metadata 169 associated with the underlying business application for which the software components 164 are designed. The business model metadata 169 may also be stored in memory 161 or in any repository storing master data for business models, such as a Master Data Repository System (MDRS), for example. In some implementations, the compiler 159 may employ a proxy approach by reading the business model metadata 169 for common and global data types of the underlying business application platform to map the data types and business objects into the scripting language. Accordingly, the compiler 159 may retrieve the business model metadata 169 in order to generate the business application code 167. The generated business application language code 167 may be generated at the client 150 but transmitted to the server 102 for storage in memory 161. In some instances, the generated business application language code 167 may include business application language snippets that can be executed using the runtime system 172.

The illustrated environment of FIG. 1 includes one or more clients 150. Each client 150 may be any computing device operable to connect to or communicate with at least the server 102 and/or via the network 112 using a wireline or wireless connection. In some implementations, as illustrated in FIG. 1, client 150 can also include a processor 156, an interface 155, a graphical user interface (GUI) 152, a client application 154, and a memory 158. In general, client 150 comprises an electronic computer device operable to receive, transmit, process, and store any appropriate data associated with the environment 100 of FIG. 1. It will be understood that there may be any number of clients 150 associated with, or external to, environment 100. For example, while illustrated environment 100 includes one client 150, alternative implementations of environment 100 may include multiple clients communicably coupled to the server 102, or any other number of clients suitable to the purposes of the environment 100. Additionally, there may also be one or more additional clients 150 external to the illustrated portion of environment 100 that are capable of interacting with the environment 100 via the network 112. Further, the term "client" and "user" may be used interchangeably as appropriate without departing from the scope of this disclosure. Moreover, while each client 150 is described in terms of being used by a single user, this disclosure contemplates that many users may use one computer, or that one user may use multiple computers.

The GUI 152 associated with client 150 comprises a graphical user interface operable to, for example, allow the user of client 150 to interface with at least a portion of the platform for any suitable purpose, such as creating, preparing, requesting, or analyzing data, as well as viewing and accessing source documents associated with software components. Generally, the GUI 152 provides the particular user with an efficient and user-friendly presentation of data provided by or communicated within the system. The GUI 152 may comprise a plurality of customizable frames or views having interactive fields, pull-down lists, and buttons operated by the user. For example, GUI 152 may provide interactive elements that allow a user to enter, modify, select, or model elements of software components in GUI 152. A view of a software component and related components may be presented and accessible to the user through GUI 152, such as through a web browser, for example. More generally, GUI 152 may also provide general interactive elements that allow a user to access and utilize various services and functions of client application 154. The GUI 152 is often configurable, supports a combination of tables and graphs (bar, line, pie, status dials, etc.), and is able to build real-time portals, where tabs are delineated by key characteristics (e.g. site or micro-site). Therefore, the GUI 152 contemplates any suitable graphical user interface, such as a combination of a generic web browser, intelligent engine, and command line interface (CLI) that processes information in the platform and efficiently presents the results to the user visually.

As used in this disclosure, client 150 is intended to encompass a personal computer, touch screen terminal, workstation, network computer, kiosk, wireless data port, smart phone, personal data assistant (PDA), one or more processors within these or other devices, or any other suitable processing device. For example, each client 150 may comprise a computer that includes an input device, such as a keypad, touch screen, mouse, or other device that can accept user information, and an output device that conveys information associated with the operation of the server 102 (and application 170) or the client 150 itself, including digital data, visual information, client application 154, or GUI 152. Both the input and output device may include fixed or removable storage media such as a magnetic storage media, CD-ROM, or other suitable media to both receive input from and provide output to users of client 150 through the display, namely, GUI 152.

While FIG. 1 is described as containing or being associated with a plurality of elements, not all elements illustrated within environment 100 of FIG. 1 may be utilized in each alternative implementation of the present disclosure. For example, although FIG. 1 depicts an environment implementing a hosted application at server 102 that can be accessed by client system 150, in some implementations, server 102 executes a local application that features an application user interface (UI) accessible to a user directly utilizing GUI 152. Further, although FIG. 1 depicts a server 102 external to network 112, servers may be included within the network 112 as part of a cloud network solution, for example. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
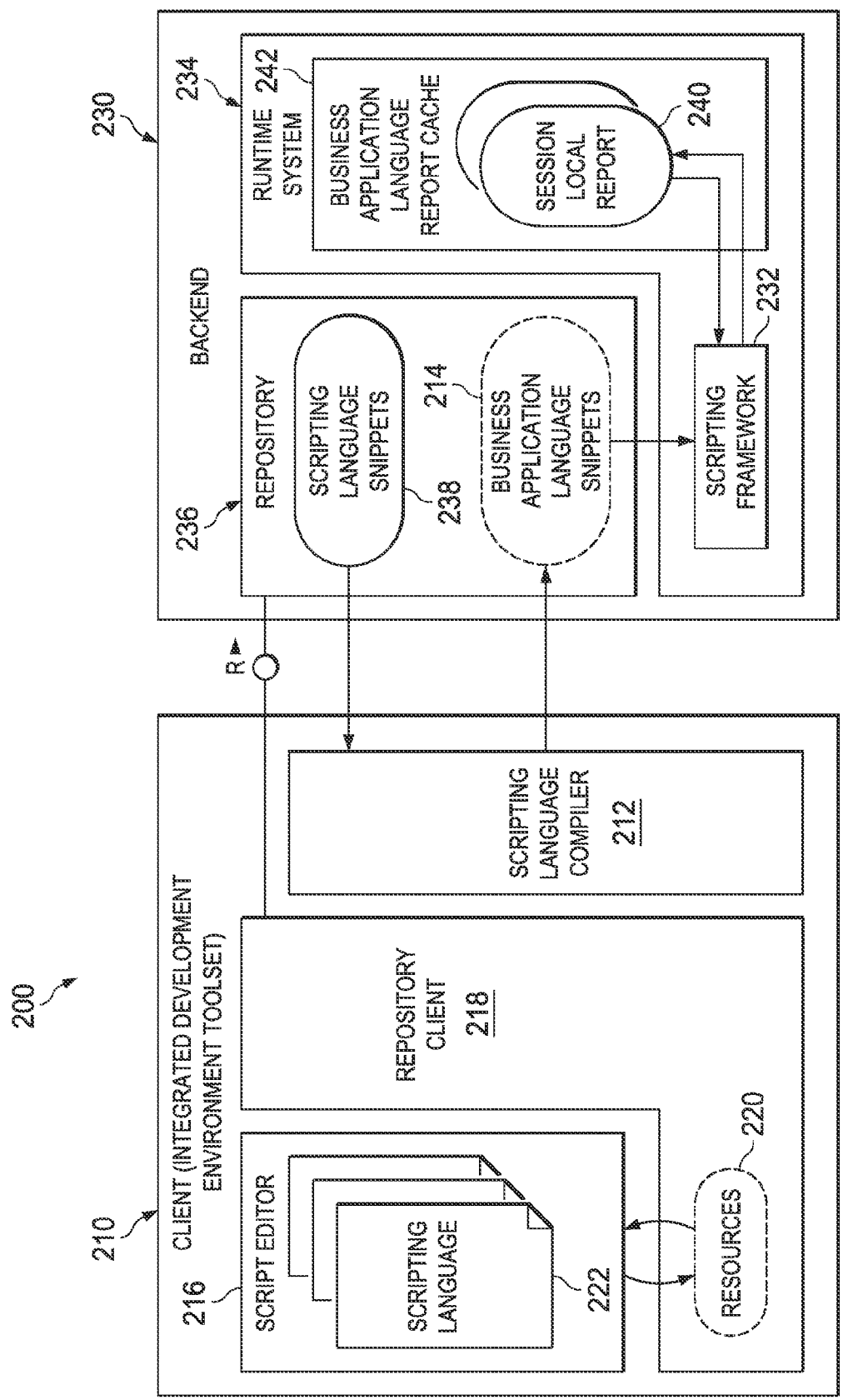
FIG. 2 illustrates an example environment for providing a scripting language for business application components using an appropriate system, such as the system described in FIG. 1.

FIG. 2 illustrates an example diagram 200 of components used to implement a scripting language for business applications. A client device 210 may execute a scripting language toolset that includes a cross compiler 212 for translating the scripting language into a business application language. Although illustrated as being located at the client device 210, the cross compiler 212 may also be located at a backend server system 230 in some implementations. A script editor 216 at the client device 210 may provide an environment for a user to enter scripting language code and to save scripting language source code files 222. In some implementations, the client device 210 may also include a repository client 218 that includes resources 220, such as development or source artifacts, used in the script editor 216 for generating scripting language source code files 222. The scripting language cross compiler 212 may be triggered by various sources or triggers within the client device 210, such as in response to each change in a scripting language source code file 222. In some instances, a compiling run may be triggered by a change in business object definition, which may affect or invalidate existing scripting language code.

In some implementations, the script editor 216 is used to generate scripting language source code files 222, which are passed to the repository client 218 to extract scripting language snippets 238 for storage in a repository 236 at a backend server system 230. In certain instances, the source code files 222 are stored locally at the repository client 218 while copies of the source code are replicated on the backend server system 230 so that other developers may concurrently work on the same source code files 222. The backend server system 230 may include components for executing a runtime system 234 and a business application language based scripting framework 232 for business application source code. In some implementations, the repository 236 may also store business application language snippets 214. The cross compiler 212 may retrieve the scripting language snippets 238 from the repository 236 for compiling and store the compiled business application language snippets 214 back in the repository 236. The scripting framework 232 may be responsible for executing the compiled business application language snippets 214 at runtime.

In some implementations, the runtime system 234 at the backend server system 230 may put the generated business application language snippets 214 into a base class context. The base class may offer reusable convenience methods for business application language code generation so that the cross compiler 212 does not need to produce low level code (e.g., LCP calls) required at runtime. The cross compiler 212 may instead generate wrapper method calls, for association access or query execution, for example. The base class in the scripting language runtime may perform delta checks of business object node data before and after the script code execution and write changes back to the persistency.

The scripting framework 232 may retrieve relevant scripting language snippets 238, generated by the cross compiler 212, for a particular business object to be executed from the repository 236. The scripting framework 232 may dynamically build a session local report 240, which may be cached in a business application language report cache 242 in the runtime system 234. In some instances, the session local report 240 is invalidated once the modification timestamp of a related business application language snippet 214 has changed.

The scripting language may maintain its extensibility through metadata driven context libraries that may be plugged into the language in a flexible manner without hardcoding context specific language or keywords into the scripting language grammar. In some implementations, this may be achieved through reuse service components (RSC). Because the cross compiler 212 may need to produce source code that may be based on re-usable convenience methods provided by the scripting framework 232, the development of the context-plugs in the cross compiler 212 and the runtime system 234 may need to be coordinated and supplied with the same metadata.

Figure 3:
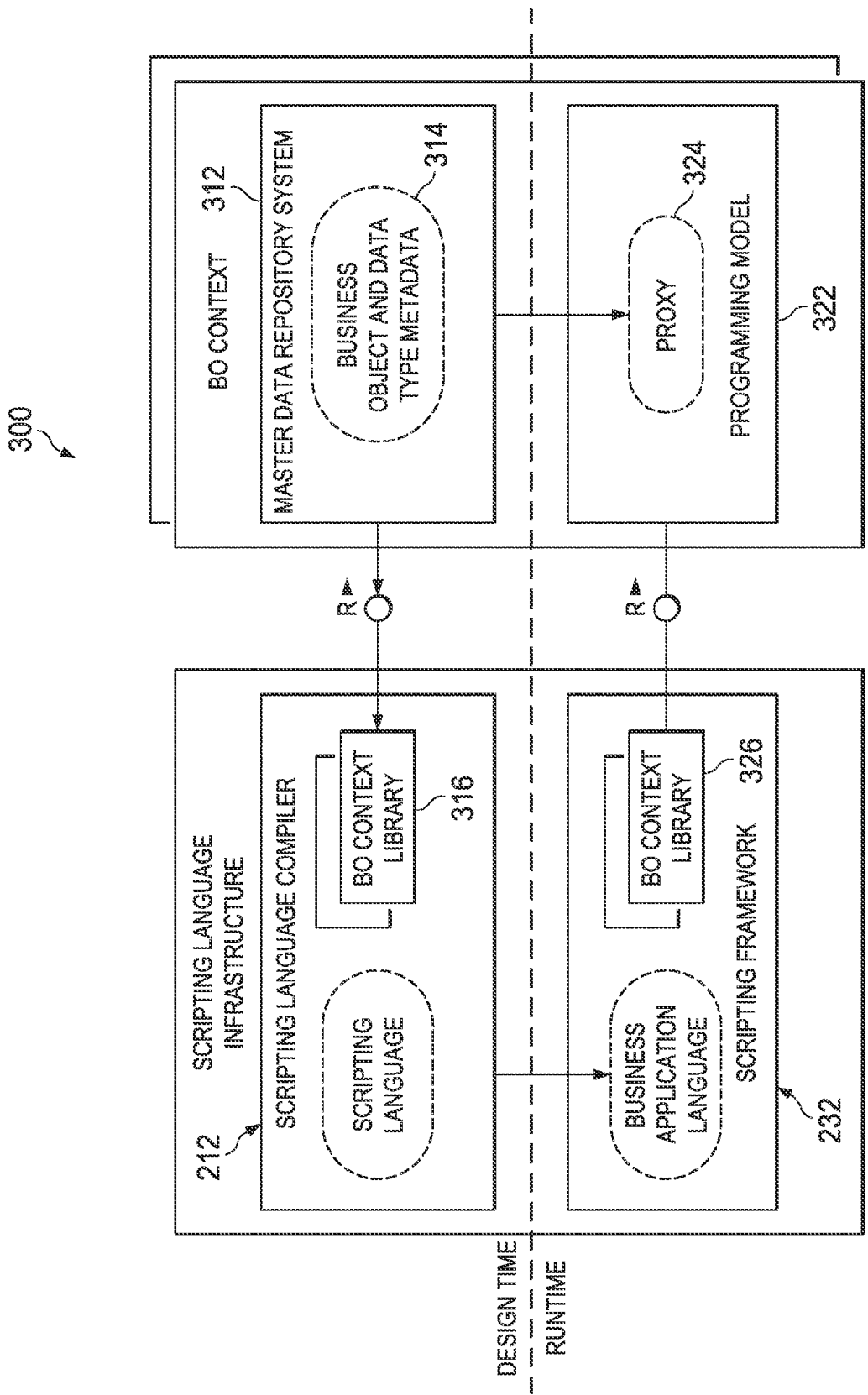
FIG. 3 is a diagram of an infrastructure for the scripting language using an appropriate system, such as the system described in FIG. 1.

FIG. 3 illustrates an example diagram 300 of the context libraries used in the scripting language in a business object context example. The context libraries 316 and 326 may provide access to different portions of the business application within the scripting language or to wrap functionality of the business application for reuse. During design time, the cross compiler 212 may only have access to the metadata for business objects and data types 314 stored in the Master Data Repository System (MDRS) 312. Based on the metadata 314 associated with the business objects and data types of the underlying business application platform, cross compiler 212 may translate the scripting language into the business application language. When the scripting framework 232 executes the generated business application session report at runtime, it is given access to the business object and data type runtime artifacts, or proxies 324, that were generated by the MDRS 312 and included in a programming model 322 associated with the business application. The cross compiler 212 may need to generate only such code that accesses context information, which may be retrieved and handled appropriately by the scripting framework 232 at runtime. In some instances the pluggable context access libraries are bound to member path expressions in the cross compiler 212.

The cross compiler 212 transforms code written in a source language into a different target language, such as a binary object code for execution. In some cases, such as when the cross compiler 212 is used for converting from a scripting language to a business application language, the higher level source language is translated to a lower level target language, which may further be compiled to executable code in a subsequent step to take advantage of the existing target language infrastructure and to avoid the need to produce platform-dependent binary code.

The cross compiler 212 may include a number of sub-components used in different phases when compiling the scripting language into the business application language. During lexical analysis, a lexer component of the cross compiler 212 may be responsible for converting the input sequence characters of the source document into a sequence of tokens. The lexer component may be internally organized into a scanner and a tokenizer. The resulting tokens are categorized blocks of text, such as symbols, identifiers, operators, delimiters and the language keywords. The tokens may be described by regular expressions that are interpreted by a tool generating the lexer code.

In some implementations, during syntactical analysis or parsing phase, a syntax analysis component parses the tokens provided by the lexer, in order to determine the syntactical structure of the source program. The parser may construct a parse tree, such as an Abstract Syntax Tree ("AST"), by transforming the linear input token sequence taken from the lexer into a tree structure according to the rules of a formal grammar description outlining the language's syntax. Syntactical errors may be reported in this phase of the cross compiler 212.

During a semantic analysis phase, the cross compiler 212 may add semantic information to the parse tree that was produced during the syntactical analysis phase. Also, symbol tables are populated and semantic checks, such as static type checking, are performed, potentially rejecting semantically incorrect input. In some implementations, the cross compiler 212 may utilize a broad meta model for the business application language, stored in the Master Data Repository System (MDRS) 312, when performing semantic analysis of the scripting language code.

The code generation phase transforms the intermediate representation (AST) to the output language. In the case of target platform binary code generation, additional optimization may be necessary to perform complex CPU register and memory allocations. As the described cross compiler 212 does not produce machine language but another high level language, the code generation may be a transformation to the target language instructions having a granularity similar to the source language.

In some implementations, instead of implementing a complete compiler with each of the components described above, a compiler-compiler or compiler generator may be used as the cross compiler 212. For example, Another Tool for Language Recognition ("ANTLR") is a parser generator tool capable of automatically generating a lexer and parser for different programming languages, defined through an Extended Backus Naur Form ("EBNF") grammar description. ANTLR also offers support for the code-generation phase though its "StringTemplate" mechanism. However, ANTLR allows enriching the EBNF grammar definition with custom code actions, which may be used to perform semantic analysis, triggered through the defined and implemented "parse events." Using a compiler generator tool such as ANTLR may allow switching of the "target generation language," e.g., from C# to C++ if the scripting language cross compiler 212 is moved to the backend/kernel.

In certain implementations, the cross compiler 212 may be configured for multi-pass parsing of source code if required by the language features of the scripting language. For instance, there may be statements in the source code that affect the translation of other statements in previous lines of the source. In such cases, the first pass may collect translation-relevant information first, while the actual translation is performed during a subsequent pass. The ANTLR parser-generator may support multi-pass parsing by transforming an existing AST to a modified version of it. To do so, the source AST is first serialized to a linear tree node stream by injecting UP and DOWN tokens, which encode the previous tree structure. Accordingly, the usual EBNF grammar-based compiler generation approach may be reused for each AST to AST transformation step. The target of a parse pass does not necessarily need to be an AST again but may also emit the final target language representation when using the StringTemplate output type in the ANTLR grammar options. This may allow for incorporating the compiler's code generation step as another compiler pass run, as shown in FIG. 4.

Figure 4:
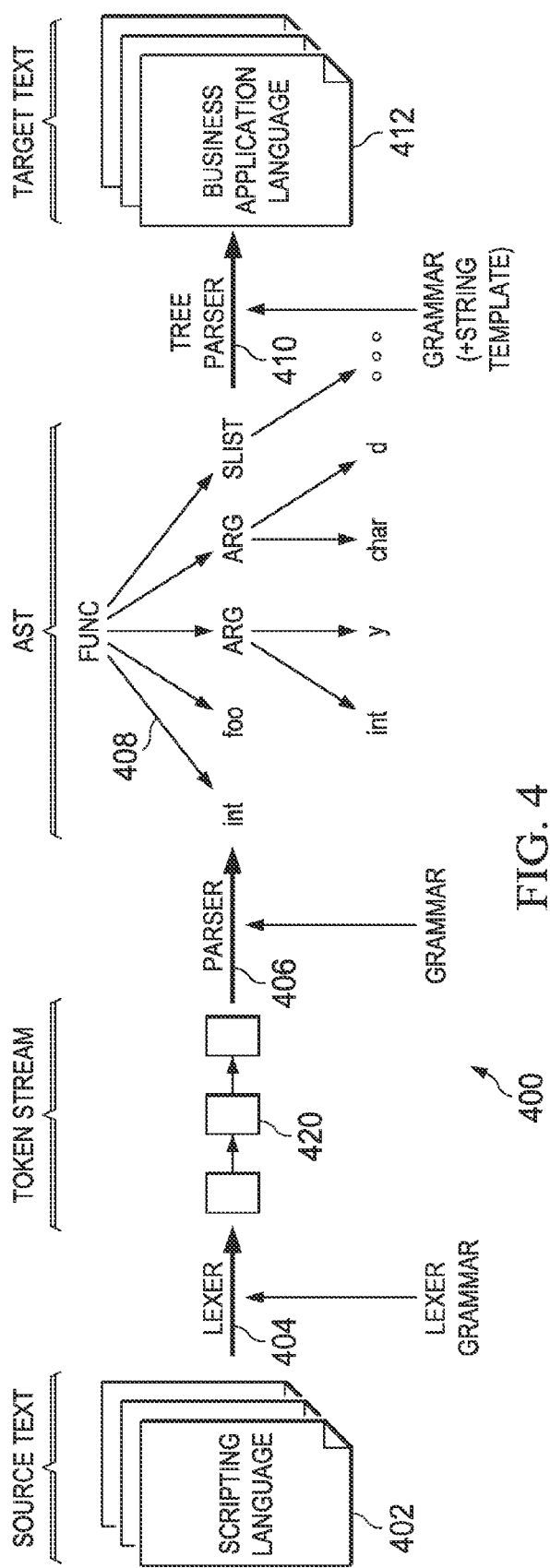
FIG. 4 is a diagram illustrating an example process for translating the scripting language using an appropriate system, such as the system described in FIG. 1.

FIG. 4 illustrates an example process 400 for multi-pass parsing performed by the cross compiler 212. First, the input characters of the source scripting language document 402 are transformed to tokens 420 by the lexer 404, generated based on the lexer grammar definition for the scripting language. The token stream 420 is then passed into the first parse run where the parser 406 performs syntactical analysis and produces the intermediate AST 408 as output. At the same time, in the first compiler pass run, the cross compiler 212 may also concurrently perform semantic analysis, realized through grammar actions. In the second pass run, a tree parser 410 may produce the final business application language output 412. In some instances, the StringTemplate mechanism may be utilized when generating the final business application language output 412.

In some implementations, custom action code may be included directly into the EBNF grammar descriptions that are the basis for ANTLR's parser generation, using the same target language that is configured for the compiler generator. This action code may be used to perform semantic analysis, such as creating symbol tables (e.g., for variable declarations), generating type inferences, and performing checking actions.

The action code embedded into the grammar description may be given access to the tokens that are available in the current rule scope. Grammar code actions may also be defined to be executed before and after rule evaluation, and parameters and return values may be specified for each matched grammar rule execution. In some implementations, rule-scope bound variables may be defined. This may avoid the need to transport information as rule parameters and rule return values through several levels of the rule invocation stack. Further, recursive rule invocations, such as rule-scope bound variables, may be maintained on a stack.

Figure 5:
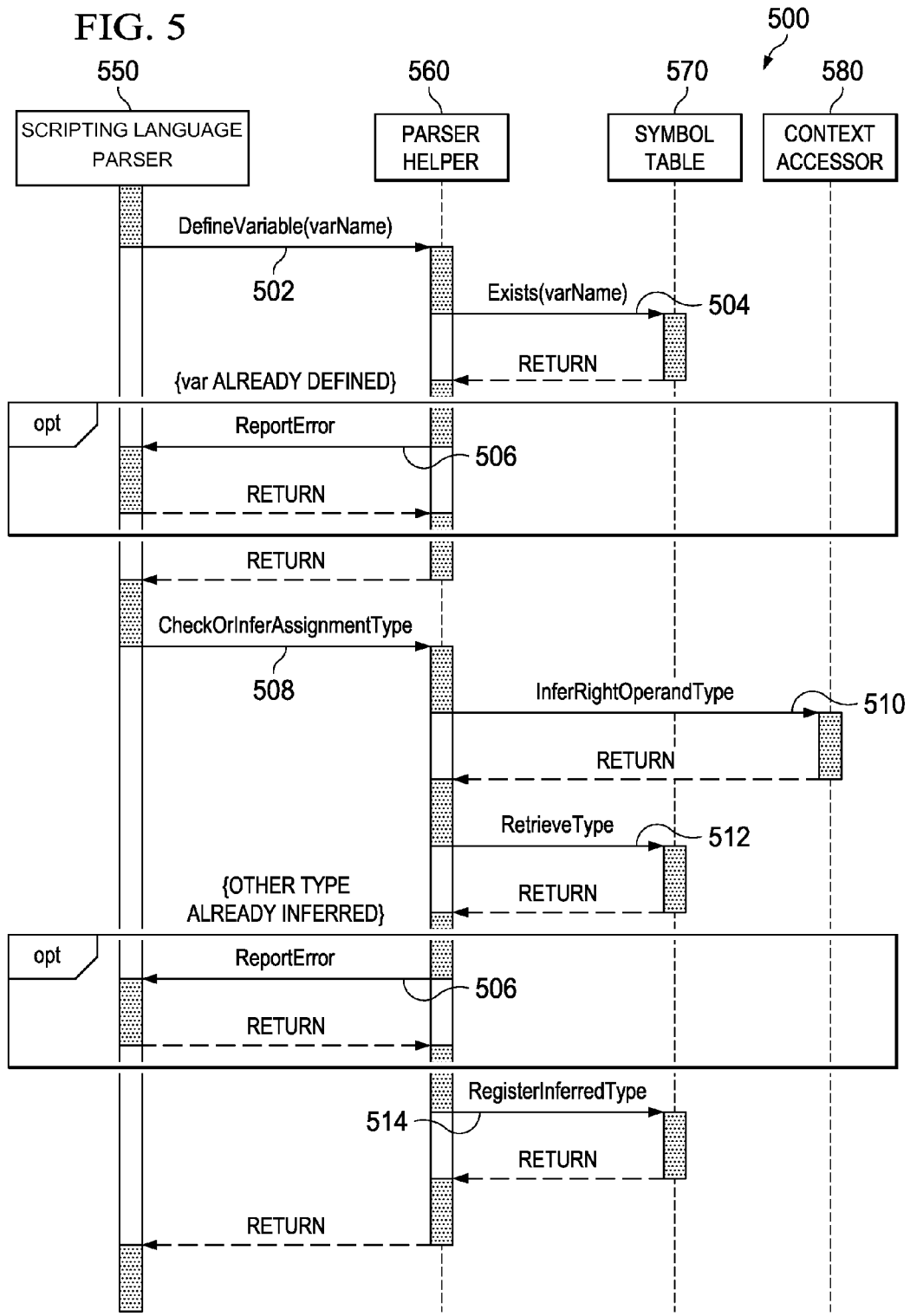
FIG. 5 is a diagram illustrating an example process for variable declaration and assignment using an appropriate system, such as the system described in FIG. 1.

FIG. 5 illustrates a flow chart 500 of the process of example action codes used by the cross compiler 212 for variable declaration and assignment. In some implementations, a scripting language parser 550 initiates a "DefineVariable" action code 502 that calls a parser helper module 560 for reserving a variable name in a variable symbol table 570. The parser helper module 560 may call an "Exists" action code 504 to access the variable symbol table 570 and reserve the variable name in the symbol table 570 if the variable name does not currently exist. If it is determined that the variable name is already defined in the variable symbol table 570, the parser helper module 560 may report an error by calling a "ReportError" action code 506. Other action codes that attempt to access variables in the variable symbol table 570 may also return an error if the variable is undefined in the variable symbol table 570.

In addition to checking the existence of the variable in the variable symbol table 570, the scripting language parser 550 may initiate a "CheckOrInferAssignmentType" action code 508 to verify whether the given type of a variable name matches the appropriate variable type corresponding to a given expression associated with the variable name. The "InferRightOperandType" action code 510 is called to check the context accessor 580 for inferring the appropriate variable type based on the context of the variable name. The "RetrieveType" action code 512 is used to retrieve the variable type from the variable symbol table 570. If another variable type is already inferred for the variable, the mismatch is reported as an error using the "ReportError" action code 506. If the type of the variable has not been inferred yet, the derived type is stored as part of the corresponding variable symbol table 570 entry using a "RegisterInferredType" action code 514.

In some implementations, the cross compiler 212 may use a StringTemplate library for producing target language output. Although the cross compiler 212 may use grammar actions that directly emit target language elements into a buffer or stream, the target language production code may be hard coded into the grammar description and may require a certain fixed language. This may restrict the code generation step of the cross compiler 212 in an inflexible way. For example, the code generation action code may not be portable if the target language for the generated compiler code needs to be changed at a later time. On the other hand, the target language of the compiler itself is hard coded into the actions, requiring a significant re-factoring effort if another code generation target language is desired.

Utilizing the StringTemplate library for code generation may introduce an additional layer of abstraction that relieves the inflexibility of using a certain target language, in both aspects, described above. The StringTemplate library exposes a well-defined application programming interface ("API") to emit named template code while filling place-holder variables in the templates with concrete values. The place-holder variables may also be filled with collections and nested with various different templates. The defined templates may either be accessed and explicitly used through the StringTemplate API, or directly used though special syntax from within ANTLR grammar descriptions. The templates may be used through special syntax if the grammar output type is configured to "template" construction, instead of "AST." Because the StringTemplate library may be ported to different platforms and is available for multiple ANTLR compiler-compiler target languages, grammar changes are not needed even if the ANTLR parser generation target language is changed. Further, the generated compiler's target language is no longer bound to the action code but is instead branched out to the template definition files. These declarative template definition files may be replaced with template code for different target languages.

In certain implementations, the scripting language may include language extensibility features. For example, new keywords may be added to the scripting language, although the introduction of keywords may be limited in frequency to prevent conflicts or compatibility issues between existing code or local variables and new keywords. In some instances, "native language methods" may be used to integrate new features into the scripting language. The methods may be bound to certain base types, which may be imported or may belong to the core of the scripting language. Examples may include an "execute" method bound to query types, "create" methods bound to association types, or "delete" methods bound to business object nodes.

In some implementations, new build-in types may be introduced to the scripting language. An instance of new types may be bound to meta model instances, such as business object nodes, for example, which may be accessible through path expressions (e.g., queries, associations). Multiple methods may then be bound to the newly introduced types using various mechanisms for generically binding certain interfaces (e.g., aggregation of methods) to a type. In other instances, the required methods may be bound directly to the meta model entity (e.g., as an association).

The language extensibility features may also include global snippet accessibility for the scripting language code. Global snippet accessibility may allow external context representations to be passed into snippets when a method signature of a scripting language snippet to be implemented is predefined by the execution context. Accordingly, references to external context information within a snippet may be maintained without being bound to specific base types, as required by certain method or library calls. In some cases, the scripting language may also support a library concept, where various extension libraries may be imported using an "import" statement. The methods that are grouped within a library may be called statically using the imported library name. In other cases, a parameter of a library method signature may be defined as an instance parameter so that the library method is automatically bound to the type of the instance parameter and may therefore be used within any path expression that evaluates to that type, if imported.

FIG. 6 illustrates an example system architecture 600 for implementing a scripting language associated with a business application language for developing software components. As seen in FIG. 6, an overall scripting language compiler for the scripting language may include multiple components, including the scripting language editor 612, the cross compiler 614, the scripting language source code 618, the scripting language runtime system 656, and the business application snippets 662. A developer 602 may use an integrated development environment 610 to design add-on components for a business application. The developer 602 may, for example, download the integrated development environment 610 from the developer of the business application to a client device. Further, multiple developers 602 may use different instances of the integrated development environment 610 to interact directly with the scripting language editor 612 for concurrent development of software components for the business application. The scripting language editor 612 may maintain the scripting language source code and holds a copy of source files in memory and on the local file system on each client instance.

The overall scripting language compiler translates the scripting language source code into a business application language. The scripting language compiler reads metadata associated with the business application programming model 658, such as metadata obtained through business object descriptions, from a backend system 650. In some implementations, a stateless HTTP channel to the backend system 650 is used to read the metadata from Repository Services 654 located in the backend system 650. The generated business application language code is also stored in the backend system 650 using a repository client 616 of the integrated development environment 610. The repository client 616 may include an interface between the scripting language editor 612 and cross compiler 614, and the repository services 654 and repository 660 on the backend system 650. Further, the repository client 616 may manage transmission and storage of source code files from the integrated development environment 610 at the client to the backend system 650.

In some implementations, individual business application snippets 662 are stored during design time, while the actual execution of the code is triggered at runtime. Different execution triggers may initiate the processing of the business application language load 664. In certain implementations, persisted business application language classes may be used in place of the business application load generation approach.

Figure 7A:
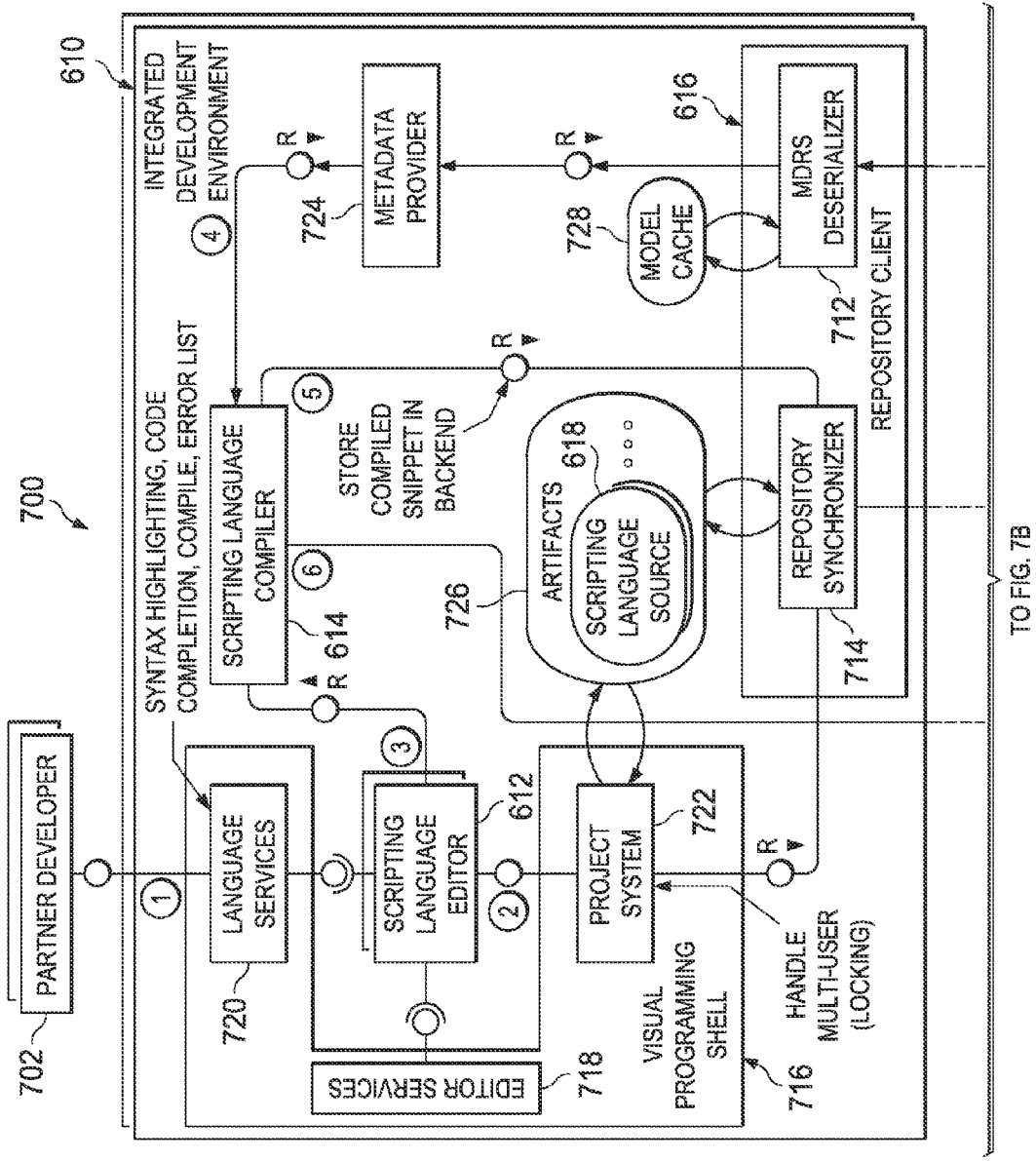
FIGS. 7A-7B are diagrams illustrating an example architecture for providing a scripting language for business application components.
Figure 7B:
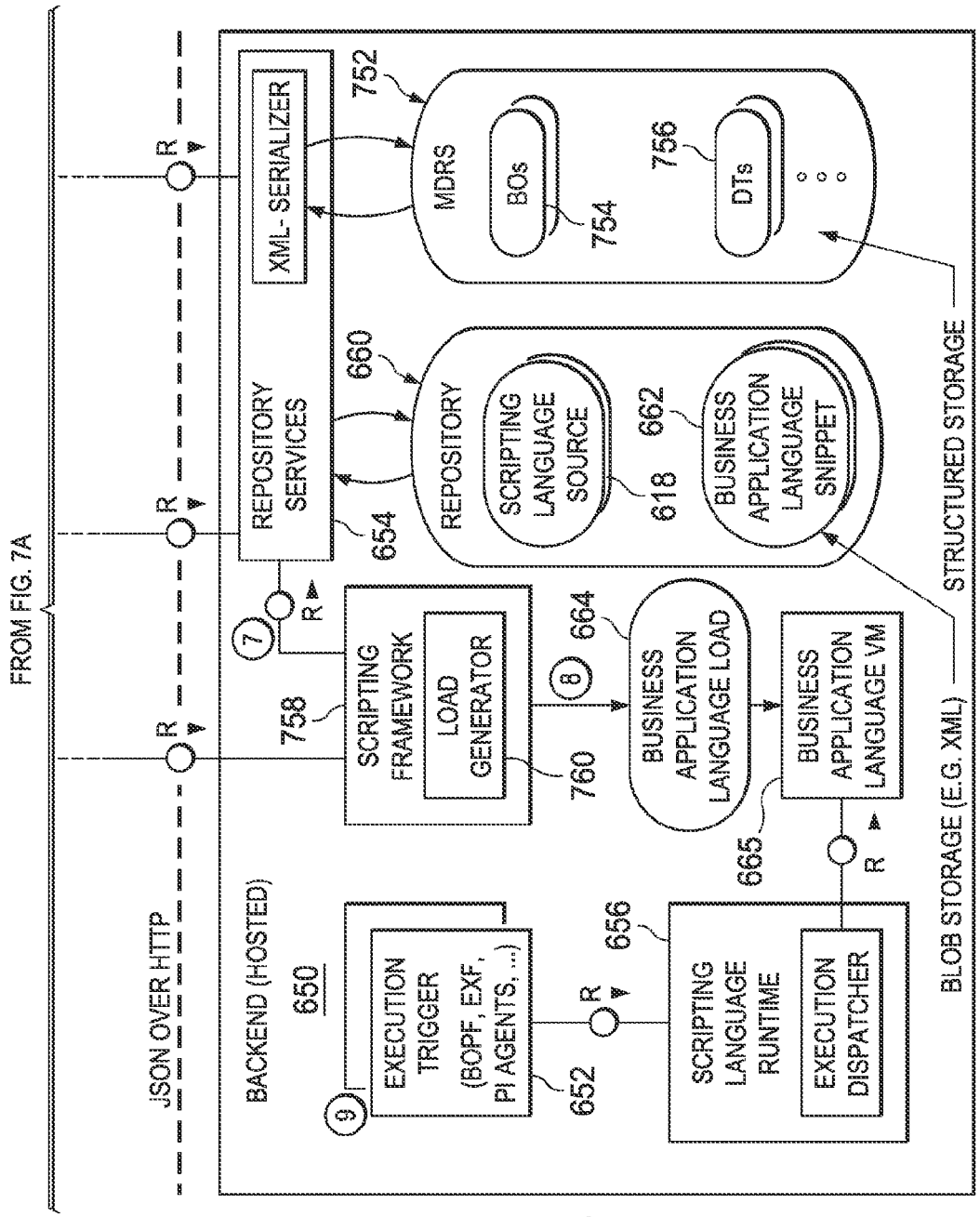

FIGS. 7A-7B illustrate another example system architecture 700 for implementing a scripting language associated with a business application language for developing software components. Referring to both FIG. 7A and FIG. 7B, at state (1), a developer 702 may use an integrated development environment 610 to design components for a business application. The integrated development environment 610 may include a visual programming shell 716 as an interface for the developer 702 to use a scripting language editor 612 for generating scripting language code. For example, the developer 702 may use the integrated development environment 610 to generate business objects and user interfaces for additional functionality for a business application. The integrated development environment 610 may provide tools for creating the user interfaces, for example, as well as allowing the developer 702 to implement the business logic of new business objects. The developer 702 may use the scripting language editor 612 to generate scripting language code for the business object instead of using a comprehensive business application language associated with the business application.

In some instances, the visual programming shell 716 may include a third-party integrated development environment, such as Microsoft Visual Studio, for example. Accordingly, the visual programming shell 716 may provide various script editing features such as syntax highlighting, code completion, and the like. The visual programming shell 716 may offer a mechanism to integrate with the integrated development environment 610 by implementing integration packages. The integration packages may be deployed to the target machines through installation into an existing visual programming shell 716 instance on a client device of the developer 702. In other instances, the developer 702 may install a separate instance of the visual programming shell 716 and deploy the integration packages through the separate instance of the shell.

In some implementations, the scripting language editor 612 may use the core editor, editor services 718, or language service environment 720 of the visual programming shell 716 to provide source code editing functionality to the developer 702. Core editor features such as, for example, block commenting, uncommenting, indenting, copy & paste, undo, and the like, may be provided without custom implementation. Code formatting may also be integrated using services of the visual programming shell 716. In certain instances, the core editor of the visual programming shell 716 is configured with a custom language service interface 720 based on the file extension of the current source code file 618 in use. The language service interface 720 may allow for implementation of various programming language related features, such as syntax highlighting, code completion, error list access and source file compilation triggers.

In some implementations, after a scripting language file is saved by the scripting language editor 612, the source code is automatically stored in a local file system at state (2). For example, development artifacts 726 associated with the current project may be controlled by a project system module 722 in the visual programming shell 716. The project system module 722 may manage cases where multiple users are generating source code for a business application using the integrated development environment 610, including handling locking mechanisms when performing multiple updates to source code. The project system module 722 ensures consistency of development artifacts 726 when multiple users of the integrated development environment 610 access the same resources. For example, the project system module 722 may coordinate the storage and use of development artifacts 726, including the scripting language source code 618 generated from the scripting language editor 612. When a scripting language source file 618 is saved by the scripting language editor 612, the save event may be intercepted to obtain the scripting language source file type. Additionally, a repository synchronizer 714 within the repository client 616 may push the content of the scripting language source code 618 to the repository services 654 at the backend system 650. Further, in certain implementations, the compilation of the scripting language source file may be triggered in response to the developer 702 entering lines of scripting language text into the scripting language editor or at periodic intervals.

After a scripting language source file compilation is triggered by the language service environment 720, the scripting language service interface 720 may call the cross compiler 614 for converting the scripting language code to the business application language code during state (3). In order to perform semantic analysis and translation of the scripting language source code into the business application language, the cross compiler 614 may need access to the business application model associated with the underlying business application platform. In some implementations, access to the business application model may be provided through a metadata provider component 724. The metadata provider component 724 may include a model application programming interface (API) that allows components within the integrated development environment 610 to read metadata associated with a business application model from a backend system 650. The metadata may include reuse library services, business objects 754 and data types 756 stored in a Master Data Repository System (MDRS) 752 at the backend system 650. In certain instances, the metadata may be transferred in an XML exchange format, and an MDRS deserializer 712 at the repository client 616 may cache the metadata in a model cache repository 728. The cross compiler 614 may then receive metadata associated with the business application model from the metadata provider component 724 at state (4) to translate the scripting language code 618 into business application language code 662. In some implementations, the compilation and translation of the scripting language code 618 may occur after each save event of the scripting language source code 618, at periodic intervals, or substantially continuously while the developer 702 enters code in the scripting language editor 612.

After the cross compiler 614 generates business application language snippets 662 based on the scripting language source code 618 and business application model metadata, the business application language snippets 662 are sent to the backend system 650 through the repository client 616 at state (5). At the backend system 650, repository services 654 may store the business application language snippets 662 in a repository 660 on the backend system 650. At the conclusion of the design time process, the cross compiler 614 may, in some implementations, trigger generation of a business application language report to detect potential syntax errors in the generated business application language code 662 at state (6).

The detection of potential errors at state (6) may ensure that the compiled business application language code may be executed at runtime. The errors detected at the backend system 650 during state (6) may be related to issues with components that were not detectable at design time through the integrated development environment 610, for example.

After the generated business application snippets 662 are stored in the repository 660, the business application snippets 662 may comprise one or more add-on components of a business application that an end-user may retrieve for deployment and execution. At runtime, the scripting framework 758 may read the business application snippets 662 that are relevant to a complete development artifact, such as a business object, to build an overall report and create a business application language load 664, through a load generator 760, for execution by the business application virtual machine 665 at state (7). The overall report may, in some instances, be stored in the repository 660. In other instances, instead of generating a report, a business application language class may be generated at state (8) that consists of individual classes for each business application snippet 662 to be dynamically transformed into the business application language load 664 at runtime. At runtime, a number of various supported execution contexts 652 may trigger the scripting language runtime 656 at state (9) to execute the business application language snippets 662.

Figure 8:
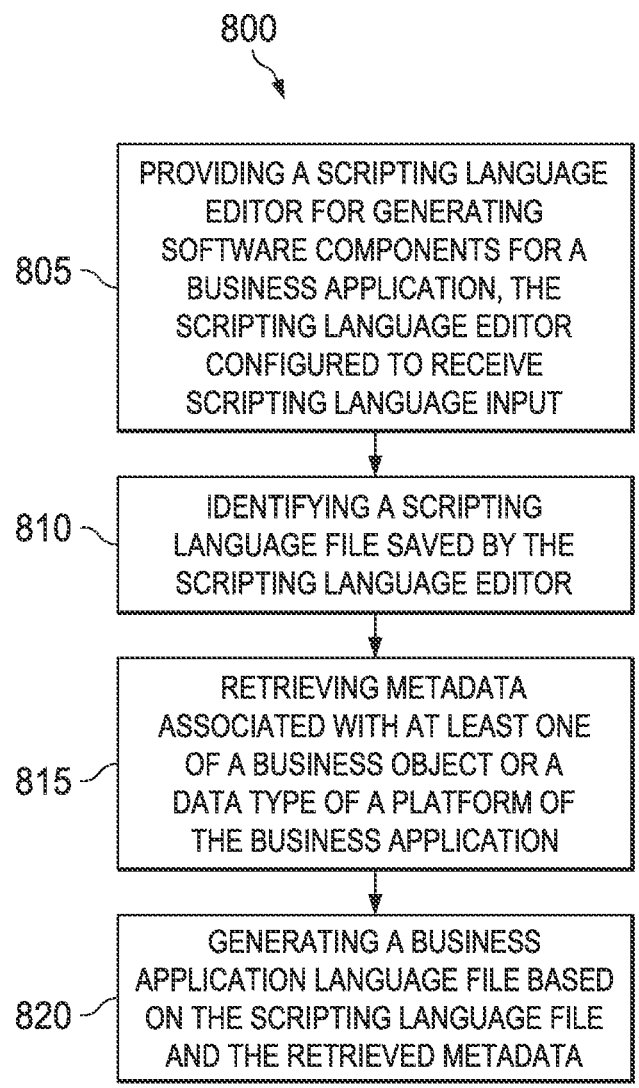
FIG. 8 is a flowchart of an example process for providing a scripting language for business application components using an appropriate system, such as the system described in FIG. 1.

FIG. 8 illustrates an example process 800 for providing a scripting language for business applications. A scripting language editor for generating software components for a business application is provided at 805. The scripting language editor may be configured to receive scripting language input. The scripting language editor may include a visual programming shell providing core source code editing features. A scripting language file saved by the scripting language editor is identified at 810. Identifying the scripting language file may include designating the scripting language file for compilation in response to a save of the scripting language file in the scripting language editor. Metadata associated with at least one of a business object or a data type of a platform of the business application is retrieved at 815. In some instances, the metadata is retrieved from a backend system hosting a runtime environment for the business application language file.

A business application language file is generated based on the scripting language file and the retrieved metadata at 820. Generating the business application language file may include translating scripting language code in the scripting language file into a business application language associated with the business application. The scripting language file may include scripting language code snippets and the business application language file may include business application language code snippets. In some implementations, the business application language file includes Advanced Business Application Programming (ABAP) code. In certain implementations, the business application language file may be transmitted to the backend system. Further, a user of the scripting language editor may be prevented from accessing data associated with users of other instances of the scripting language editor, wherein the other instances of the scripting language editor are connected to the backend system.

The preceding figures and accompanying description illustrate example processes and computer implementable techniques. Environment 100 (or its software or other components) also contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors, the method comprising the following operations:
providing a scripting language editor for generating software components for a business application, the scripting language editor configured to receive input associated with a scripting language and save the input and software components into a scripting language file on a repository on a backend server system;
providing a scripting language compiler for identifying a scripting language file and retrieving and cross-compiling the software components of the scripting language file saved by the scripting language editor, wherein the cross-compiling comprises:
retrieving metadata from a backend server system, the metadata associated with at least one of a business object or a data type of a platform of the business application;
creating one or more metadata-driven context libraries associated with the scripting language, the one or more metadata-driven context libraries providing access to context information for the at least one business object or data type at runtime; and
generating, by a computer, a business application language file comprising only reusable software components based on a translation of the software components of the scripting language file and the metadata; and
executing the business application language file at runtime, the business application language file comprising only code that accesses context information at runtime based on the metadata, wherein the code within the business application language file when executed drives the one or more metadata-driven context libraries to produce context-specific source code corresponding to the reusable software components.

2. The method of claim 1, wherein the metadata is retrieved from a backend system hosting a runtime environment for the business application language file.

3. The method of claim 2 further comprising transmitting the business application language file to the backend system.

4. The method of claim 2 further comprising preventing a user of the scripting language editor from accessing data associated with users of other instances of the scripting language editor, wherein the other instances of the scripting language editor are connected to the backend system.

5. The method of claim 1, wherein generating the business application language file includes translating scripting language code in the scripting language file into a business application language associated with the business application.

6. The method of claim 1, wherein the scripting language file includes scripting language code snippets and the business application language file includes business application language code snippets.

7. The method of claim 1, wherein the business application language file includes Advanced Business Application Programming (ABAP) code.

8. The method of claim 1, wherein the scripting language editor includes a visual programming shell providing core source code editing features.

9. The method of claim 1, wherein identifying the scripting language file includes designating the scripting language file for compilation in response to a change in content of the scripting language file in the scripting language editor.

10. A computer program product encoded on a non-transitory, tangible storage medium, the product comprising computer readable instructions for causing one or more processors to perform operations comprising:
providing a scripting language editor for generating software components for a business application, the scripting language editor configured to receive input associated with a scripting language and save the input and software components into a scripting language file on a repository on a backend server system;
providing a scripting language compiler for identifying a scripting language file and retrieving and cross-compiling the software components of the scripting language file saved by the scripting language editor, wherein the cross-compiling comprises:
retrieving metadata from a backend server system, the metadata associated with at least one of a business object or a data type of a platform of the business application;
creating one or more metadata-driven context libraries associated with the scripting language, the one or more metadata-driven context libraries providing access to context information for the at least one business object or data type at runtime; and
generating, by a computer, a business application language file comprising only reusable software components based on a translation of the software components of the scripting language file and the metadata; and
executing the business application language file at runtime, the business application language file comprising only code that accesses context information at runtime based on the metadata, wherein the code within the business application language file when executed drives the one or more metadata-driven context libraries to produce context-specific source code corresponding to the reusable software components.

11. The computer program product of claim 10, wherein the metadata is associated with the business model, wherein the business model if of a platform of the business application, and wherein the metadata includes metadata associated with at least one of a business object or a data type of the platform of the business application.

12. The computer program product of claim 10, wherein the metadata is retrieved from a backend system hosting a runtime environment for the business application language file.

13. The computer program product of claim 12, wherein the operations further comprise transmitting the business application language file to the backend system.

14. The computer program product of claim 12, wherein the operations further comprise preventing a user of the scripting language editor from accessing data associated with users of other instances of the scripting language editor, wherein the other instances of the scripting language editor are connected to the backend system.

15. The computer program product of claim 10, wherein generating the business application language file includes translating scripting language code in the scripting language file into a business application language associated with the business application.

16. A system, comprising:
memory operable to store scripting language files;
one or more processors operable to:
provide a scripting language editor for generating software components for a business application, the scripting language editor configured to receive input associated with a scripting language and save the input and software components into a scripting language file on a repository on a backend server system;
provide a scripting language compiler for identifying a scripting language file and retrieving and cross-compiling the software components of the scripting language file saved by the scripting language editor, wherein the cross-compiling comprises:
retrieve metadata from a backend server system, the metadata associated with at least one of a business object or a data type of a platform of the business application;
create one or more metadata-driven context libraries associated with the scripting language, the one or more metadata-driven context libraries providing access to context information for the at least one business object or data type at runtime; and
generate, by a computer, a business application language file comprising only reusable software components based on a translation of the software components of the scripting language file and the metadata; and
execute the business application language file at runtime, the business application language file comprising only code that accesses context information at runtime based on the metadata, wherein the code within the business application language file when executed drives the one or more metadata-driven context libraries to produce context-specific source code corresponding to the reusable software components.

17. The system of claim 16, wherein the scripting language file includes scripting language code snippets and the business application language file includes business application language code snippets.

18. The system of claim 16, wherein the business application language file includes Advanced Business Application Programming (ABAP) code.

19. The system of claim 16, wherein the scripting language editor includes a visual programming shell providing core source code editing features.

20. The system of claim 16, wherein generating the business application language file includes translating scripting language code in the scripting language file into a business application language associated with the business application.

* * * * *